UNITED STATES PATENT OFFICE.

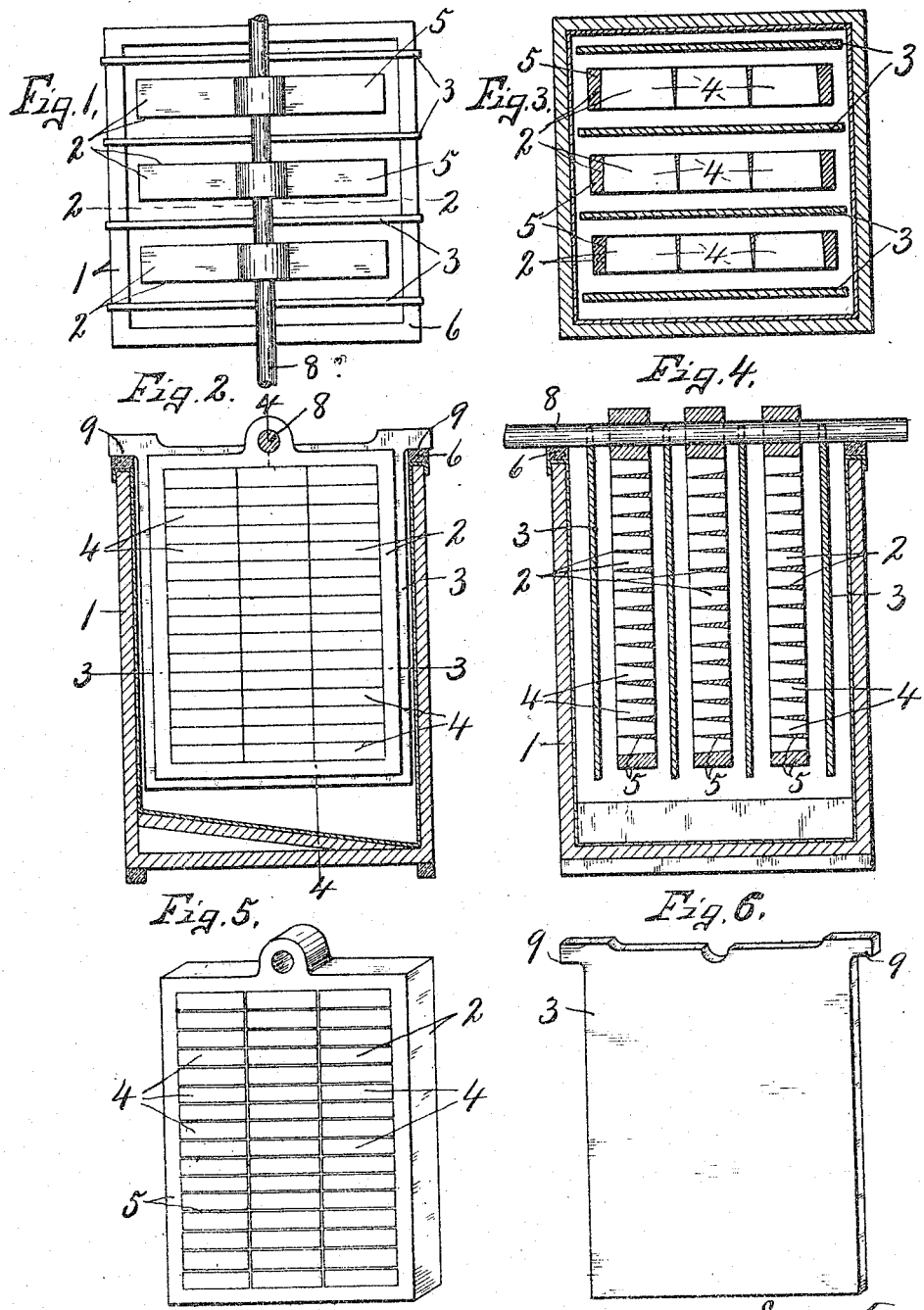

HENRY K. HESS, OF PHILADELPHIA, PENNSYLVANIA.

METHOD OF RECOVERING COPPER FROM ORE OR MATTE BY ELECTROLYSIS.

No. 881,580.

Specification of Letters Patent.

Patented March 10, 1908.

Application filed January 31, 1907. Serial No. 355,145.

*To all whom it may concern:*

Be it known that I, HENRY K. HESS, of Philadelphia, in the county of Philadelphia, in the State of Pennsylvania, have invented new and useful Improvements in Methods of Recovering Copper from Ore or Matte by Electrolysis, of which the following, taken in connection with the accompanying drawings, is a full, clear, and exact descripiton.

This invention relates to certain improvements in the method of recovering copper from natural ore or matte by electrolysis.

The essential object of my invention is to extract or recover copper and other soluble metals directly from the natural ores or matte by means of electric energy, as distinguished from the smelting or lixiviating processes. In other words, I have sought to simplify the method of recovering copper and other metals from natural ore by electrolysis, by subjecting one or more electrodes composed of comminuted or pulverized copper ore mixed with a suitable bond, as clay, and small particles of combustible fiber formed into briquets, bricks or ore particles which have been previously burned or baked to liberate any volatile matter therein, such as sulfur and its gases, and to incinerate the combustible fiber incorporated therein, whereby the composition constituting the electrode is porous, but is further confined within an electric conducting frame of acid resisting material, such as lead, the purpose being to allow the electrolyte and electric current to permeate the entire mass of ore for liberating the copper therein. These briquets, bricks or ore particles are made under a process described in my pending application, Serial No. 355,143 filed January 31, 1907 and the completed electrode constitutes the subject-matter of my pending application No. 355,144 filed January 31, 1907.

During the heating of the briquets, bricks or ore particles the cohesive bond, as clay, which unites the comminuted particles of ore or matte is baked or hardened; the gases and volatile matter is driven off and the oxidizable metals contained therein are oxidized, and at the same time the fibrous material incorporated in the briquets bricks or ore particles is incinerated leaving the briquet, brick or ore particle extremely porous and more readily susceptible to the electrolytic action of diluted acid which is employed in my present process to liberate copper. A suitable number of these porus briquets, bricks or ore particles are then arranged side by side and end to end within a suitable sand mold, forming the subject matter of my pending application, Serial No. 355,144 filed January 31, 1907 leaving a slight space between the contiguous faces of the briquets, bricks or ore particles after which the acid resisting metal frame, as lead, is cast around and between the series of briquets, bricks or ore particles for supporting the latter, the object in using a sand mold being to permit the escape of the gases and other vapors which may be liberated by the heat. The series of briquets, bricks or ore particles which are thus confined within the lead frame constitute an electrode, and in the electrolytic process of recovering the copper from the briquets, forming the subject matter of my present application, I preferably employ a series of these electrodes alternating with suitable supports or electrodes upon which the liberated copper may be deposited during the electrolytic action, it being understood that these electrodes are placed within a suitable cell containing the electrolyte.

In the drawings,—Figure 1 is a top plan of an electrolytic process for carrying out the objects of my invention. Figs. 2, 3, and 4 are sectional views taken respectively on lines 2—2, Fig. 1; 3—3, Fig. 2, and 4—4, Fig. 2. Figs. 5 and 6 are perspective views showing respectively the briquet, brick or ore particle electrode and support for the copper deposit.

As shown in the drawings, this electrolytic apparatus comprises a cell —1— and electrodes —2— and —3—, the electrodes —2— alternating with the electrodes —3— and consisting of a plurality of porous briquets, bricks or ore particles —4— arranged side by side and end to end, and confined within a cast lead frame —5—, as set forth in my pending application No. 355,144 filed January 31, 1907. These porous briquets, bricks or ore particles are composed of finely comminuted or pulverized copper ore with a cohesive bond, as clay, together with a heat destructible fiber, all of which is thoroughly mixed and incorporated into a compact mass and then subjected to heat to incinerate the combustible fiber, leaving the briquet, brick or ore particle uniformly porous, and therefore, more readily susceptible to the action of the electrolytic acid in liberating the copper. This electric action is well understood, and need not be specifically described in this application further than to state that the electrolyte usually consists of a dilute sulfuric or hydrochloric acid capable of speedily permeating the briquets and dissolving the copper which is dispelled by the action of the electric current and deposits or collects upon the electrodes or supports —3—.

The cell —1— may be of any suitable material, but in this particular instance consists of an outer shell of wood lined with sheet lead and surmounted by a frame —6— of insulating material, as porcelain, upon which the electrodes —2— and —3— are supported, the electrodes —2— being provided with lateral offsets or shoulders —9— and the electrodes —2— are suspended upon a bar —8—, the opposite ends of the bar —8— and shoulders —9— resting upon the upper face of the insulating frame —6— to electrically insulate the electrodes from each other.

In order to facilitate the removal of any precipitate of the electrodes from the cell the bottom of such cell is preferably inclined from one side towards its opposite side for the purpose of localizing said material at the low point of the cell into which one end of a suitable siphon may be immersed for the purpose of drawing off such accumulations.

It will be seen from the foregoing description that this process, briefly stated, consists in supporting in a suitable electrolyte, a series of electrodes containing one or more porous briquets, bricks or ore particles of comminuted or pulverized copper ore, bound together by a suitable bond capable of resisting the acid in the liberation or dissolution of the copper therefrom, and further confining the briquets, bricks or ore particles in a lead frame, which is cast around and between the briquets in the mold so as to assure a firm contact of the lead with the briquets, bricks or ore particles in the formation of the electrode, and in addition to this, to immerse in the same electrolyte, suitable supports or electrodes for the copper deposit of copper which is liberated by the electrolytic action of the electric current.

What I claim is:

1. The herein described process of recovering copper from natural ore or matte consisting in immersing porous briquets containing particles of comminuted ore in an electrolyte together with a lead electrode in permanent contact with the briquets and subjecting the same to the action of an electric current for the liberation of the copper.

2. The herein described process of recovering copper from natural ore consisting in mixing a quantity of comminuted copper ore together with a body of clay, subsequently vitrifying the clay to bind the ore particles together and immersing the whole in a suitable electrolyte in the presence of suitable electrodes, one of which is in permanent contact with the body of ore and clay for liberating the copper therefrom.

3. The herein described process of recovering copper from ores consisting in forming a briquet of comminuted ore, clay and vegetable fiber, then heating the briquet thus formed sufficiently to destroy the fiber and to vitrify the clay, thus rendering the briquet porous, and immersing the briquet in a suitable electrolyte in the presence of suitable electrodes, one of which is in permanent contact with the briquet for liberating the copper therefrom.

4. The herein described method of recovering copper from its ores by electrolysis consisting in immersing into a suitable electrolyte a self-sustaining electrode of comminuted copper ore held together by a bond of vitrified clay and supporting a lead conductor, and then subjecting the electrode and electrolyte to the action of an electric current in the presence of a second electrode for the deposition of the copper.

5. The herein described method of recovering copper from its ores consisting in confining comminuted copper containing ore by means of an earthy bond burned to hardness to increase its porosity and to render the body of comminuted ore self-sustaining and affixing a lead conductor to the porous body to form an electrode, immersing the electrode together with a second electrode for receiving the copper deposit into a suitable electrolyte and subjecting said electrodes to the action of an electrical current, whereby the copper is expelled from the porous body without disintegrating the latter.

In witness whereof I have hereunto set my hand this 2nd day of January 1907.

HENRY K. HESS

Witnesses:
H. E. CHASE,
MILDRED M. NOTT